(12) United States Patent
Liu

(10) Patent No.: US 9,986,763 B2
(45) Date of Patent: Jun. 5, 2018

(54) ELECTRONIC CIGARETTE

(71) Applicant: HUIZHOU KIMREE TECHNOLOGY CO., LTD. SHENZHEN BRANCH, Shenzhen (CN)

(72) Inventor: Qiuming Liu, Shenzhen (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 95 days.

(21) Appl. No.: 15/142,394

(22) Filed: Apr. 29, 2016

(65) Prior Publication Data
US 2016/0242468 A1 Aug. 25, 2016

Related U.S. Application Data

(63) Continuation of application No. 14/030,752, filed on Sep. 18, 2013.

(30) Foreign Application Priority Data

Jul. 30, 2013 (CN) ..................... 2013 2 0461753 U

(51) Int. Cl.
A24F 47/00 (2006.01)
H01M 2/20 (2006.01)
H01M 2/10 (2006.01)
H01M 2/30 (2006.01)

(52) U.S. Cl.
CPC .......... *A24F 47/008* (2013.01); *A24F 47/002* (2013.01); *H01M 2/105* (2013.01); *H01M 2/20* (2013.01); *H01M 2/30* (2013.01); *H01M 2220/30* (2013.01)

(58) Field of Classification Search
CPC ..................................... A24F 47/008
See application file for complete search history.

(56) References Cited

U.S. PATENT DOCUMENTS

| 1,121,300 | A | * | 12/1914 | Singley | A24F 13/14 131/175 |
| 3,534,890 | A | * | 10/1970 | Iannacone | A61M 15/009 222/325 |
| D729,162 | S | * | 5/2015 | Liu | A24F 47/008 D13/119 |

(Continued)

Primary Examiner — James Harvey
(74) Attorney, Agent, or Firm — Tim Tingkang Xia, Esq.; Locke Lord LLP

(57) ABSTRACT

An electronic cigarette includes a power rod, an atomizer, and a connecting structure. The connecting structure includes a first connecting member and a second connecting member. The first connecting member includes a rotary buckle device, the rotary buckle device defines a butt-jointed slot and includes at least one buckle-jointed portion extending into the butt-jointed slot; the second connecting member defines a groove and a guide surface. In assembly, the buckle-jointed portion is aligned with the guide surface, the rotary buckle device is sheathed on the second connecting member and axially moved to the groove, the rotary buckle device is rotated to buckle the buckle-jointed portion with the groove. The connection mode is simple and novelty, can improve the production efficiency and facilitate users to change the atomizer, and meets users' personalized needs.

13 Claims, 6 Drawing Sheets

(56) References Cited

U.S. PATENT DOCUMENTS

| | | | | |
|---|---|---|---|---|
| D739,599 S * | 9/2015 | Liu | ............... | A24F 47/008 |
| | | | | D27/101 |
| 9,609,893 B2 * | 4/2017 | Novak, III | ............ | A24F 47/008 |
| 9,769,878 B2 * | 9/2017 | Xiang | ................. | H05B 1/0252 |
| 2015/0013701 A1 * | 1/2015 | Liu | ............... | A24F 47/008 |
| | | | | 131/329 |
| 2015/0189695 A1 * | 7/2015 | Xiang | ............... | G06K 7/10861 |
| | | | | 219/209 |
| 2016/0150821 A1 * | 6/2016 | Liu | ............... | A24F 47/008 |
| | | | | 131/329 |
| 2016/0183593 A1 * | 6/2016 | Liu | ............... | A24F 47/008 |
| | | | | 392/386 |
| 2016/0183594 A1 * | 6/2016 | Liu | ............... | A24F 47/008 |
| | | | | 392/386 |
| 2016/0242468 A1 * | 8/2016 | Liu | ............... | A24F 47/008 |
| 2017/0099879 A1 * | 4/2017 | Heidl | ............... | A24F 47/008 |

* cited by examiner

ELECTRONIC CIGARETTE

CROSS-REFERENCE TO RELATED APPLICATIONS

This application is a continuation application of U.S. patent application Ser. No. 14/030,752, filed Sep. 18, 2013, which itself claims priority to and benefit of, under 35 U.S.C. § 119(a), Chinese Patent Application No. 201320461753.3, filed in P.R. China on Jul. 30, 2013, which are hereby incorporated herein in their entireties by reference.

FIELD OF THE INVENTION

This present invention relates to the field of electrical heating technology, and more particularly to an electronic cigarette.

BACKGROUND OF THE INVENTION

Because of strengthening of national anti-smoking publicity and improvement of the people's healthy consciousness, electronic cigarettes serving as substitutes for traditional tobacco have been more and more widely used. An electronic cigarette generally consists of a power rod and an atomizer fixed with each other. In an electronic cigarette in the prior art, the method for connecting the atomizer with the power rod is usually a threaded connection. By rotating the atomizer or the power rod, physical and electrical connections between the atomizer and the power rod can be established. When smoke oil in the atomizer is finished, by rotating the atomizer reversely, the atomizer can be detached from the power rod and be replaced by a new one.

However, in the threaded connection method, it is difficult to judge whether the power rod and the atomizer are located in correct places or not. The power rod and the atomizer may dislocate from each other, assembly and disassembly of the thread connection are inconvenient and not human-based, and users' experience is poor. When users use electronic cigarettes in the threaded connection mode, the users may usually generate psychological resistance, which is not conducive to quit smoking. Additionally, as an appearance and a hand feeling of an electronic cigarette are required to imitate that of a real cigarette to the greatest extent and the electronic cigarette itself has many components, a diameter of the electronic cigarette is small, and a wall of the electronic cigarette is thin. Thus, when screw threads are formed on the electronic cigarette, not only the manufacture is inconvenient, but also the mechanical strength of the electronic cigarette is reduced. The electronic cigarette is prone to be broken, and a service life of the electronic cigarette is short.

SUMMARY OF THE INVENTION

The object of the present invention is to provide an electronic cigarette using a simple connection method and achieving a firm connection, thereby solving the problem in the prior art that the aforementioned connection between the atomizer and the power rod is complicated and the atomizer and the power rod are prone to dislocate from each other.

In order to realize the object mentioned above, an electronic cigarette is constructed. The electronic cigarette comprises a power rod, an atomizer, and a connecting structure disposed at a butt-jointed position between the power rod and the atomizer to connect the power rod with the atomizer; the connecting structure including a first connecting member and a second connecting member; the first connecting member includes a rotary buckle device that is capable of rotating, and the rotary buckle device defines a butt-jointed slot and includes at least one buckle-jointed portion extending into an interior of the butt-jointed slot; the second connecting member defines a groove extending along a radial direction of the second connecting member and a guide surface matching the buckle-jointed portion and axially extending to the groove; in assembly of the electronic cigarette, the buckle-jointed portion is aligned with the guide surface, the rotary buckle device is sheathed on the second connecting member and axially moved to the groove, and the rotary buckle device is rotated to buckle the buckle-jointed portion with the groove.

An outer circumferential surface of the rotary buckle device is concave-convex shaped.

The rotary buckle device includes a rotary piece configured for rotating and a buckle-jointed sleeve fixedly connected with the rotary piece, and the buckle-jointed portion is mounted on an inner wall of the buckle-jointed sleeve.

The buckle-jointed sleeve is sleeved in the rotary piece, and is rotated along with the rotary piece simultaneously.

A thickness of the buckle jointed sleeve is smaller than a width of the groove.

When the number of the buckle-jointed portions is more than one, and the buckle-jointed portions are mounted on the inner wall of the buckle-jointed sleeve at intervals.

The first connecting member further includes a first outer electrode and a first inner electrode both sheathed on the rotary buckle device for electric conduction, and the first outer electrode and the first inner electrode are insulated from each other.

The first connecting member further includes a first insulating piece, and the first insulating piece is disposed between the first outer electrode and the first inner electrode to electrically isolate the first outer electrode from the first inner electrode.

The first outer electrode includes a cylinder body sleeved in the power rod and a protruding edge extending out of the power rod and extending along a radial direction of the cylinder body; a gap is formed between the protruding edge and an end surface of the power rod, a diameter of an inner side wall of the rotary piece near the end surface of the power rod gradually reduces to form a bulge, and the bulge is embedded in the gap and abuts against the protruding edge.

The protruding edge is disposed between the buckle-jointed sleeve and the bulge, the buckle-jointed sleeve abuts against an end surface of the protruding edge, and the buckle-jointed portion is a convex surface or a concave surface disposed throughout the whole inner wall of the buckle-jointed sleeve.

The buckle-jointed sleeve is fixed with the rotary piece by riveting pressure.

The buckle-jointed sleeve is made of metal electric conductive material, and is electrically connected to the first outer electrode and the second connecting member respectively.

The second connecting member includes a second outer electrode, a second insulating piece, and a second inner electrode; the second insulating piece and the second inner electrode are successively sleeved in the second outer electrode, and the second insulating piece is disposed between the second outer electrode and the second inner electrode to electrically isolate the second outer electrode from the second inner electrode.

The second outer electrode includes a body sleeved in the atomizer and an extending portion extending out of the atomizer, a diameter of the extending portion is smaller than a diameter of the body, a side wall of the extending portion near the body sinks downward to form the groove, and the guide surface is formed on another side wall of the extending portion.

The atomizer and the power rod are respectively provided with an atomization sleeve and a battery sleeve, one of the first connecting member and the second connecting member is mounted on one of the atomization sleeve and the battery sleeve, the other of the first connecting member and the second connecting member is mounted on the other of the atomization sleeve and the battery sleeve, and the battery sleeve is detachably connected with the atomization sleeve by a connection between the first connecting member and the second connecting member.

By implementing the electronic cigarette of the present invention, the following advantages can be achieved: in use, the buckle-jointed portion is aligned with the guide surface, and the buckle-jointed portion contacts and fits the guide surface; the second connecting member is inserted into the butt-jointed slot and moved axially until the buckle-jointed sleeve is aligned with the groove; thus, the rotary buckle device is rotated and drives the buckle-jointed sleeve and the rotary piece to rotate simultaneously, and the buckle-jointed sleeve is buckled with the groove. Meanwhile, the buckle-jointed portion and the guide surface are mutually staggered, and the second outer electrode is unable to move out of the first outer electrode. In this way, the atomizer is connected with the power rod. In the electronic cigarette of the present invention, when the atomizer is inserted in the power rod, as long as the rotary buckle device is rotated, the atomizer can be connected with the power rod. This connection mode is simple in operation, novelty in designation, and easy to assemble, and can improve the production efficiency. Moreover, the connection mode is convenient to disassemble and can facilitate the users to change the atomizer. The connection mode further has good mechanical strength and meets the users' personalized needs.

BRIEF DESCRIPTION OF THE DRAWINGS

The present invention will be further described with reference to the accompanying drawings and embodiments in the following.

DETAILED DESCRIPTION OF THE PREFERRED EMBODIMENT

Figure 1:
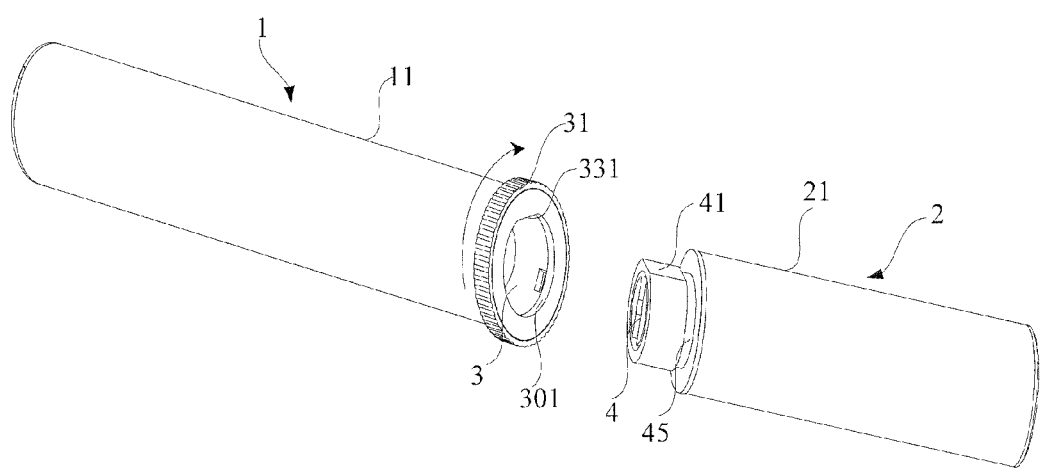
FIG. 1 is a schematic view of a disassembled structure of an electronic cigarette of a first embodiment of the present invention.

In order to understand the technical features, the purpose and the effect of the present invention more clearly, the specific embodiments of the present invention will be described referring to the drawings.

Figure 2:
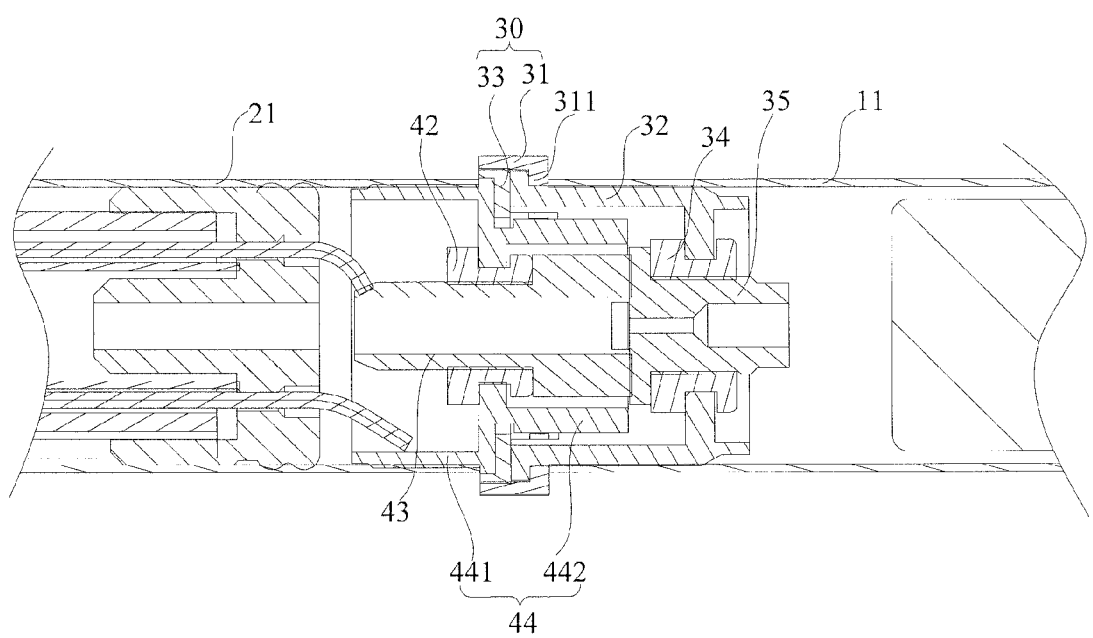
FIG. 2 is a cut-away view of an assembled structure of the electronic cigarette shown in FIG. 1.

Referring to FIG. 1 and FIG. 2, a first embodiment of the present invention provides an electronic cigarette comprising a power rod 1, an atomizer 2, and a connecting structure disposed at a butt-jointed position between the power rod 1 and the atomizer 2. The connecting structure includes a first connecting member 3 and a second connecting member 4, and the power rod 1 is connected with the atomizer 2 by a connection between the first connecting part 3 and the second connecting part 4.

It is understandable that the first connecting member 3 is mounted on an end of the power rod 1 near the atomizer 2, and the second connecting member 4 is mounted on an end of the atomizer 2 near the power rod 1. By rotating in-ordination after inserting the first connecting member 3 into the second connecting member 4, the first connecting member 3 is fixed on the second connecting member 4, so that the power rod 1 is connected with the atomizer 2. In other embodiments, the second connecting member 4 can also be mounted on the end of the power rod 1 near the atomizer 2, and the first member 3 should be mounted on the atomizer 2 correspondingly, so that the atomizer 2 is connected with the power rod 1.

In the embodiment, particularly the power rod 1 is sheathed with a battery sleeve 11, and the first connecting member 3 is embedded inside the battery sleeve 11. The atomizer 2 is sheathed with an atomization sleeve 21, and the second connecting member 4 is embedded inside the atomization sleeve 21. By rotating the first connecting member 3 relative to the second connecting member 4 and buckling the first connecting member 3 with the second connecting member 4, the power rod 1 is connected with the atomizer 2, and the battery sleeve 11 is detachably connected with the atomization sleeve 21.

The first connecting member 3 includes a rotary buckle device 30, a first outer electrode 32, a first insulating piece 34, and a first inner electrode 35. The first insulating piece 34 is disposed between the first outer electrode 32 and the first inner electrode 35, so that the first outer electrode 32 is electrically isolated from the first inner electrode 35, that is, the first outer electrode 32 and the first inner electrode 35 are insulated from each other. Both the first outer electrode 32 and the first inner electrode 35 have electrical conductive function. The rotary buckle device 30 is fixed on the first outer electrode 32 and can rotate relative to the first outer electrode 32.

Figure 3:
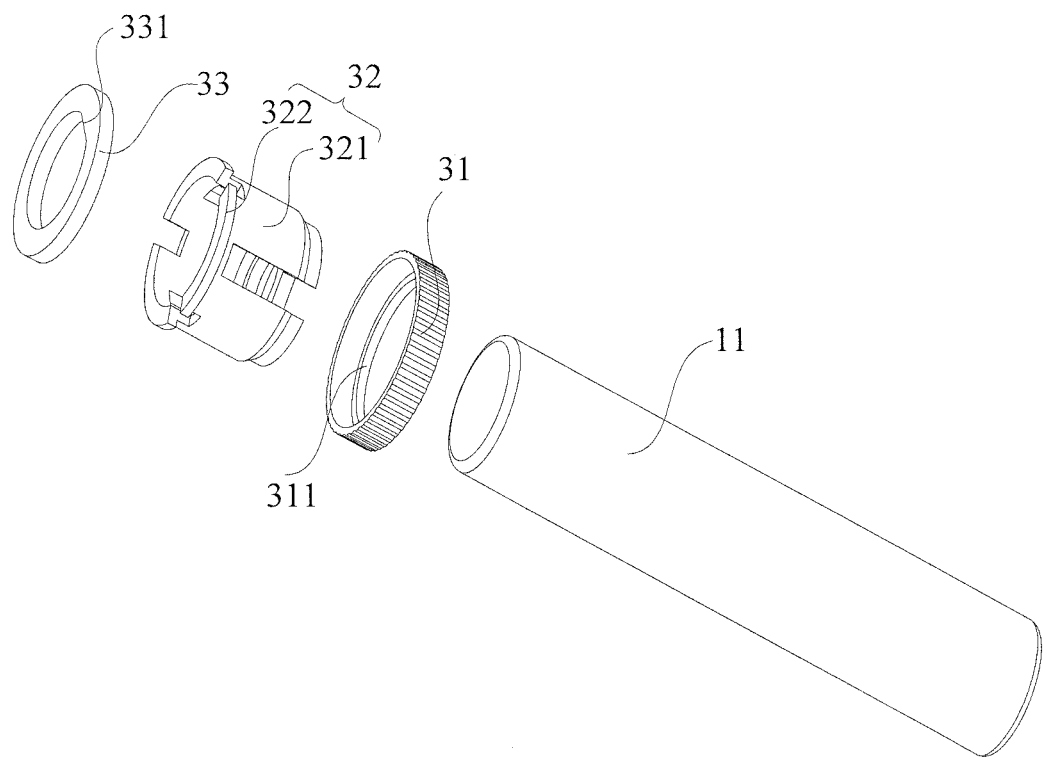
FIG. 3 is a partially exploded structural view of the electronic cigarette shown in FIG. 2.

Referring to FIG. 3, the first outer electrode 32 is approximately a hollow cylinder, and includes a cylinder body 321 and a protruding edge 322 extending along a radial direction of the cylinder body 321. The cylinder body 321 is sleeved inside the battery sleeve 11, the protruding edge 322 extends out of the battery sleeve 11, and a gap (not labeled in the drawings) is formed between the protruding edge 322 and an end surface of the battery sleeve 11. The first insulating piece 34 and the first inner electrode 35 are successively sleeved inside the cylinder body 321, and the first insulating piece 34 is disposed between the cylinder body 321 of the first outer electrode 32 and the first inner electrode 35, so that the first outer electrode 32 and the first inner electrode 35 are electrically isolated from each other.

The rotary buckle device 30 includes a rotary piece 31 configured for rotating and a buckle-jointed sleeve 33, and the buckle-jointed sleeve 33 is sleeved inside the rotary piece 31. In this way, the buckle-jointed sleeve 33 is fixedly connected with the rotary piece 31, and the buckle-jointed sleeve 33 can be simultaneously rotated along with the rotary piece 31. Preferably, a circumferential surface of the rotary buckle device 30 is uneven to increase friction and facilitate users to rotate the rotary buckle device 30.

The rotary piece 31 is a hollow cylinder with two opening ends. The rotary piece 31 is fixed on the power rod 1 and can rotate relative to the power rod 1, and an outer diameter of the rotary piece 31 is greater than an outer diameter of the power rod 1. The hollow cylinder of rotary piece 31 forms a butt-jointed slot 301 configured for enabling the second connecting member 4 to insert. In this embodiment, an end of the rotary piece 31 is rotatably connected with an end of the battery sleeve 11, and the outer diameter of the rotary piece 31 is greater than an outer diameter of the battery sleeve 11. A diameter of an inner side wall of the rotary piece 31 near an end surface of the battery sleeve 11 gradually reduces to form a bulge 311, and the bulge 311 is embedded in the gap formed between the protruding edge 322 and the battery sleeve 11. Two end surfaces of the bulge 311 abut against an end surface of the protruding edge 322 and an end surface of the battery sleeve 11 respectively, so that the rotary piece 31 is connected with the battery sleeve 11. Preferably, an outer surface of the rotary piece 31 is uneven to increase friction of the rotary piece 31 and facilitate users to rotate the rotary piece 31. It is understandable that the outer surface of the rotary piece 31 can also form other textures or patterns for increasing friction.

The buckle-jointed sleeve 33 is also a hollow cylinder with two opening ends, and a thickness of the buckle-jointed sleeve 33 is smaller than a thickness of the rotary piece 31. The buckle-jointed sleeve 33 is sleeved in the rotary piece 31 and fixedly connected with the rotary piece 31, so that the buckle-jointed sleeve 33 can rotate along with the rotary piece 31 simultaneously. Particularly, the buckle-jointed sleeve 33 is fixed at an inner side wall of the rotary piece 31 that is far away from the bulge 311. In this embodiment, the protruding edge 322 is inserted between the buckle-jointed sleeve 33 and the bulge 311, and two end surfaces of the protruding edge 322 abut against the rotary piece 31 and the buckle-jointed sleeve 33 respectively. In this embodiment, at least one buckle-jointed portion 331 is mounted on an inner wall of the buckle-jointed sleeve 33. The buckle-jointed portion 331 extends into the butt-jointed slot 301, and the buckle-jointed portion 331 is a convex surface or a concave surface throughout the whole inner wall of the buckle-jointed sleeve 33. That is, the buckle-jointed portion 331 is a flat surface structure and is formed by the inner wall of the buckle-jointed sleeve 33 bulging upward or sinking downward. In this invention, the number of the buckle-jointed portion 331 is not limited, and then can be one or more. When the number of the buckle jointed portions 331 is more than one, the buckle-jointed portions 331 are mounted on the inner wall of the buckle-jointed sleeve 33 at intervals.

The buckle-jointed sleeve 33 is made of metal electrical conductive material such as silver or copper, which has electrical conductive function. Preferably, the buckle-jointed sleeve 33 and the rotary piece 31 are riveted and pressed to be fixed with each other, so that the buckle-jointed sleeve 33 can rotate along with the rotary piece 31 simultaneously. Understandably, the buckle-jointed sleeve 33 and the rotary piece 31 can also be fixed with each other by other means such as adhesion.

It is understandable that in other embodiments the buckle-jointed sleeve 33 and the rotary piece 31 can be integrated.

The second connecting member 4 includes a second outer electrode 44, a second insulating piece 42, and an inner electrode 43. The second insulating piece 42 and the second inner electrode 43 are successively sleeved in the second outer electrode 44, that is, the second insulating piece 42 is disposed between the second outer electrode 44 and the second inner electrode 43, so that the second outer electrode 44 and the second inner electrode 43 are electrically isolated from each other. Both the second outer electrode 44 and the second inner electrode 43 are made of metal material and have electrical conductive function.

The second outer electrode 44 is approximately a hollow cylinder and includes a body 441 and an extending portion 442. The body 441 is sleeved in the atomizer 2, the extending portion 442 is disposed out of the atomizer 2, and a diameter of the extending portion 442 is smaller than a diameter of the body 441. In this embodiment, the body 441 is sleeved in the atomizer 21 and the extending portion 442 extends out of the atomizer 21. An end of the extending portion 442 near the body shrinks radially to form the groove 45, the groove 45 extends along a radial direction of the extending portion 442, and a width of the groove 45 is greater than a thickness of the buckle-jointed sleeve 33, an outer circumferential surface of the extending portion 442 further forms a guide surface 41 which can contact and fit the buckle-jointed portion 331 and axially extend to the groove 45. The guide surface 41 matches the buckle-jointed portion 331, therefore, the guide surface 41 is a convex surface or a concave surface formed on the side wall of the extending portion 442. It is understandable that when the buckle-jointed portion 331 is a convex surface, the guide surface 41 is a concave surface; and when the buckle-jointed portion 331 is a concave surface, the guide surface 41 is a convex surface. By fitting the guide surface 41 with the buckle-jointed portion 331, the extending portion 442 of the second outer electrode 44 is inserted into the first outer electrode 32. When the second outer electrode 44 is completely inserted inside the first outer electrode 32, the buckle-jointed portion 331 corresponds to the groove 45 in positions, that is, the buckle-jointed sleeve 33 corresponds to the groove 45 in position. The groove 45 forms space configured for enabling the buckle-jointed sleeve 33 to rotate, and thus the buckle-jointed sleeve 33 can rotate simultaneously along with the rotary piece 31. It is understandable that the width of the groove 45 is greater than the thickness of the buckle-jointed sleeve 33 so that a space structure configured for receiving the buckle-jointed sleeve 33 is formed.

In the electronic cigarette provided by the first embodiment of the invention, the number of the buckle-jointed portion 331 and the number of the guide surface 41 are both one. The buckle-jointed portion 331 is a convex surface, and the guide surface 41 is a concave surface. In assembly of the electronic cigarette in this embodiment, by aligning the buckle-jointed portion 331 with the guide surface 41, the buckle-jointed portion 331 contacts and fits the guide surface 41, and the extending portion 442 is inserted into the butt-jointed slot 301 and axially moved. When the second outer electrode 44 is completely inserted inside the first outer electrode 32, the buckle-jointed sleeve 33 with the buckle-jointed portion 331 corresponds to the groove 45 in position, and then the rotary buckle device 30 is rotated to buckle the buckle-jointed sleeve 33 with the groove 45. At this time, the buckle-jointed portion 331 and the guide surface 41 are mutually staggered, and the second outer electrode 44 is not able to move out of the first outer electrode 32. In this way, the atomizer 2 is connected with the power rod 1, and the atomization sleeve 21 is detachably connected with the battery sleeve 11. Referring to FIG. 2, in the electronic cigarette after assembly, the first outer electrode 32 electrically contacts the second outer electrode 44 via the buckle-jointed sleeve 33, the first inner electrode 35 electrically contacts the second inner electrode 43, and the outer electrode (i.e., 32, 44) and the inner electrode (i.e., 35, 43) are respectively connected with the positive electrode and the negative electrode of the battery. In this way, current can flow through the electronic cigarette and supply heat to a heating wire to atomize smoke oil.

In the electronic cigarette of the present invention, the buckle-jointed portion 331 is aligned with the guide surface 41, the buckle-jointed portion 331 contacts and fits the guide surface 41, and the extending portion 442 of the second connecting member 4 is inserted into the butt-jointed slot 301 and axially moved until the buckle-jointed sleeve 33 corresponds to the groove 45 in position. Thus, the rotary buckle device 30 is rotated so that the buckle-jointed sleeve 33 and the rotary piece 31 are rotated simultaneously, and the buckle-jointed sleeve 33 is buckled with the groove 45. At this time, the buckle-jointed portion 331 and the guide surface 41 are mutually staggered, and the second outer electrode 44 is not able to move out of the first outer electrode 32, so that the atomizer 2 is connected with the power rod 1. In the electronic cigarette of the present invention, when the atomizer 2 is inserted in the power rod 1, as long as the rotary piece 31 is rotated, the atomizer 2 can be connected with the power rod 1. Thus, the connection mode is simple in operation, novelty in designation, easy to assemble, and can improve the production efficiency. Moreover, the connection mode is convenient to disassemble and can facilitate users to change the atomizer. The connection mode further has good mechanical strength and meets the users' personalized needs.

Figure 4:
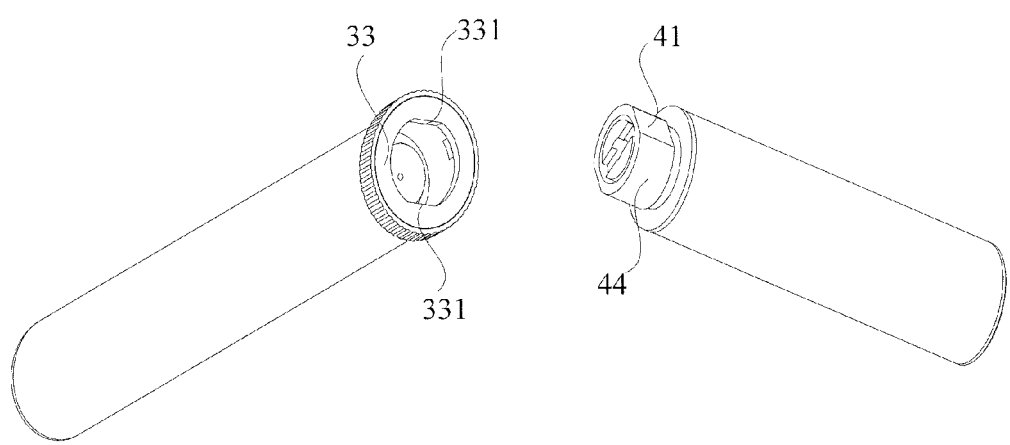
FIG. 4 is a schematic view of a disassembled structure of an electronic cigarette of a second embodiment of the present invention.
Figure 5:
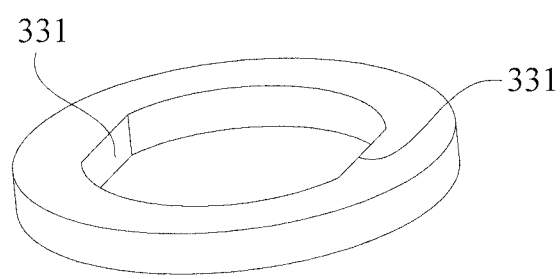
FIG. 5 is a schematic structural view of a buckle jointed sleeve shown in FIG. 4.
Figure 6:
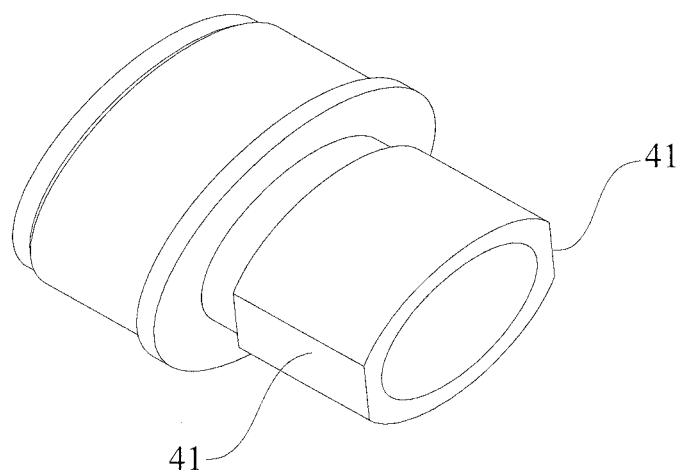
FIG. 6 is a schematic structural view of a second outer electrode shown in FIG. 4.

Referring to FIG. 4, FIG. 5, and FIG. 6, an electronic cigarette provided by a second embodiment of the invention differs from the first embodiment in that: the number of the buckle-jointed portions 331 on the inner wall of the buckle-jointed sleeve 33 is two, the two buckle-jointed portions 331 are mounted on the inner wall of the buckle-jointed sleeve 33 at intervals, and the two buckle-jointed portions 331 are symmetrical to each other about a central axis line of the buckle-jointed sleeve 33. Correspondingly, the number of the guide surfaces 41 of the second outer electrode 44 fitting the two buckle-jointed portions 331 is also two. The assembly principle of the electronic cigarette of the second embodiment is the same as in the first embodiment, and is not repeated here. It is understandable that the number of the buckle-jointed portions 331 can be more in other embodiments.

The present invention has been described with the drawings to the embodiments, while the present invention is not limit to the aforementioned specific embodiments and the specific embodiments are merely a hint rather than a limit. It will be understood by those skilled in the art that various changes may be made and equivalents may be substituted without departing from the purpose of the invention and the scope of the claims, but all the changes will be included within the scope of the appended claims.

What is claimed is:

1. An electronic cigarette, comprising a power rod, an atomizer, and a connecting structure disposed at a butt-jointed position between the power rod and the atomizer to connect the power rod with the atomizer; the connecting structure including a first connecting member and a second connecting member; wherein, the first connecting member includes a rotary buckle device that is capable of rotating, and the rotary buckle device defines a butt-jointed slot and includes at least one buckle-jointed portion extending into an interior of the butt-jointed slot; the second connecting member defines a groove extending along a radial direction of the second connecting member and a guide surface matching the buckle-jointed portion and axially extending to the groove;

wherein, in assembly of the electronic cigarette, the buckle-jointed portion is aligned with the guide surface, the rotary buckle device is sheathed on the second connecting member and axially moved to the groove, and the rotary buckle device is rotated to buckle the buckle-jointed portion with the groove; and wherein the rotary buckle device includes a rotary piece configured for rotating and a buckle-jointed sleeve fixedly connected with the rotary piece, and the buckle-jointed portion is mounted on an inner wall of the buckle-jointed sleeve.

2. The electronic cigarette of claim 1, wherein, an outer circumferential surface of the rotary piece is textures for increasing friction.

3. The electronic cigarette of claim 1, wherein, the atomizer and the power rod are respectively provided with an atomization sleeve and a battery sleeve, one of the first connecting member and the second connecting member is mounted on one of the atomization sleeve and the battery sleeve, the other of the first connecting member and the second connecting member is mounted on the other of the atomization sleeve and the battery sleeve, and the battery sleeve is detachably connected with the atomization sleeve by a connection between the first connecting member and the second connecting member.

4. The electronic cigarette of claim 1, wherein, the buckle-jointed sleeve is sleeved in the rotary piece, and is rotated along with the rotary piece simultaneously.

5. The electronic cigarette of claim 1, wherein, a thickness of the buckle-jointed sleeve is smaller than a width of the groove.

6. The electronic cigarette of claim 1, wherein, when the number of the buckle-jointed portions is more than one, and the buckle-jointed portions are mounted on the inner wall of the buckle-jointed sleeve at intervals.

7. The electronic cigarette of claim 1, wherein, the first connecting member further includes a first outer electrode and a first inner electrode both sheathed on the rotary buckle device for electric conduction, and the first outer electrode and the first inner electrode are insulated from each other.

8. The electronic cigarette of claim 7, wherein, the first connecting member further includes a first insulating piece, and the first insulating piece is disposed between the first outer electrode and the first inner electrode to electrically isolate the first outer electrode from the first inner electrode.

9. The electronic cigarette of claim 7, wherein, the first outer electrode includes a cylinder body sleeved in the power rod and a protruding edge extending out of the power rod and extending along a radial direction of the cylinder body; a gap is formed between the protruding edge and an end surface of the power rod, a diameter of an inner side wall of the rotary piece near the end surface of the power rod gradually reduces to form a bulge, and the bulge is embedded in the gap and abuts against the protruding edge.

10. The electronic cigarette of claim 9, wherein, the protruding edge is disposed between the buckle-jointed sleeve and the bulge, the buckle-jointed sleeve abuts against an end surface of the protruding edge, and the buckle-jointed portion is a convex surface or a concave surface disposed throughout the whole inner wall of the buckle-jointed sleeve.

11. The electronic cigarette of claim 9, wherein, the buckle-jointed sleeve is fixed with the rotary piece by riveting pressure.

12. The electronic cigarette of claim 9, wherein, the buckle-jointed sleeve is made of metal electric conductive material, and is electrically connected to the first outer electrode and the second connecting member respectively.

13. The electronic cigarette of claim 1, wherein, the second connecting member includes a second outer electrode, a second insulating piece, and a second inner electrode; the second insulating piece and the second inner electrode are successively sleeved in the second outer electrode, and the second insulating piece is disposed between the second outer electrode and the second inner electrode to electrically isolate the second outer electrode from the second inner electrode.

* * * * *